United States Patent Office 3,219,548
Patented Nov. 23, 1965

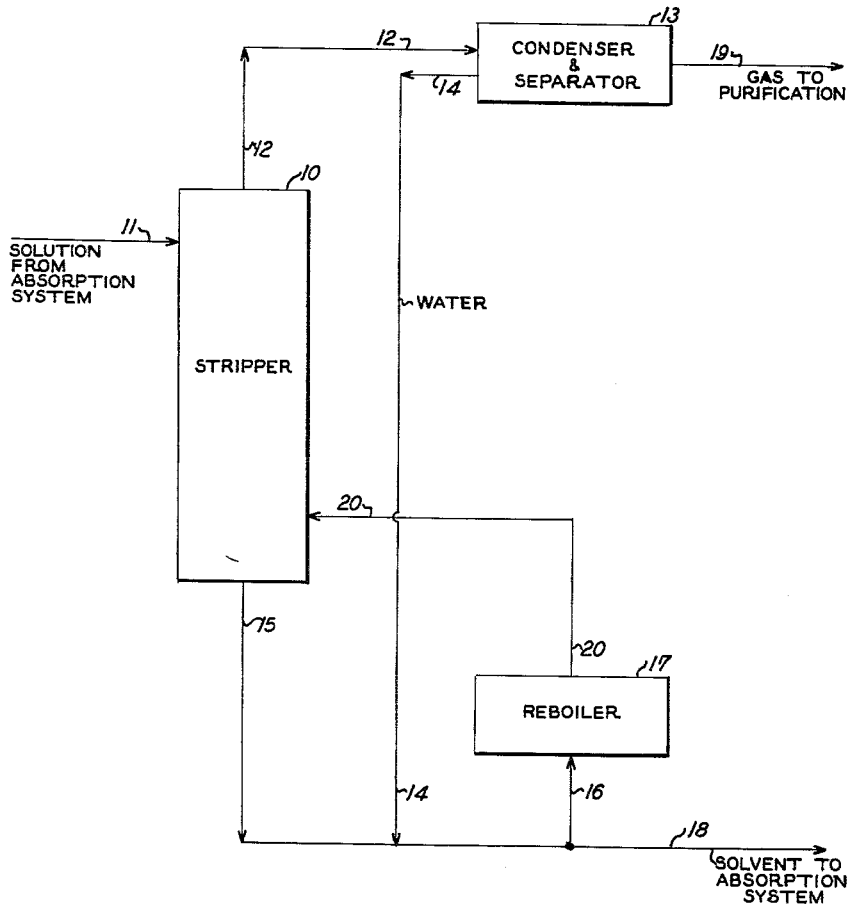

3,219,548
DISTILLATION PROCESS FOR STRIPPING LOW
BOILING MATERIAL FROM SOLUTION
Irwin B. Margiloff, New York, N.Y., assignor to Halcon
International, Inc., a corporation of Delaware
Filed Aug. 28, 1962, Ser. No. 219,842
4 Claims. (Cl. 202—42)

This invention relates to process and apparatus for stripping a lower boiling material from a solution thereof in a higher boiling material by heating the solution and vaporizing out the lower boiling material, more particularly to such processes wherein an inert material of intermediate boiling range is included in the system, and at least a part of this intermediate boiling material is recycled to the boiling system, whereby the total system pressure is increased, or, alternatively a lower boiling temperature is required and the degradation of solvent is minimized. The invention also relates to apparatus adapted for carrying out such a process.

Absorption and stripping are well known procedures for recovering lower boiling materials by absorption thereof in a higher boiling material followed by stripping the absorbed material from the solution. However, these processes often suffer from the requirement of a relatively high boiling temperature having a relatively low pressure at the given temperature, and this may introduce severe losses due to degradation of solvent. In addition, the high temperatures often require special heating media. The art is confronted by the problem of providing more efficient processes and apparatus carrying out such processes with the avoidance of such draw-backs.

The discoveries associated with the invention and relating to the solution of the above problems, and the objects achieved in accordance with the invention as set forth herein include the provision of:

A process for separating a solution of a lower boiling material in a relatively higher boiling material by stripping the former from the solution, including the improvement which comprises including in the system an inert material of intermediate boiling range which is miscible in the solvent whereby a higher total pressure is maintained in the system, a relatively lower boiling temperature is required;

Such a process wherein a solution of acetylene is stripped from a solution thereof in N-methyl-pyrrolidone containing a small portion of water;

Such a process wherein a solution of acetylene is stripped from a solution thereof in butyrolactone containing a small portion of water;

An apparatus adapted for stripping a lower boiling material from a solution thereof in a higher boiling material containing a small percent of intermediate boiling material which is miscible in the solution including the combination of a stripping means provided with feed means, solvent draw-off means connected to reboiling means which in turn is connected to the stripping means, said stripping means being provided with lower boiling material draw-off means and intermediate vapor draw-off condensation and separation means, the latter being provided with means for returning vapor to the stripping means and with means for condensing, separating, and returning intermediate boiling materials to the solvent draw-off means between the stripping means and the reboiling means;

And other objects which will be apparent as details or embodiments of the invention are set forth hereinafter.

As pointed out above, the instant invention permits the stripping operation to be performed at a higher total system pressure and/or a lower boiling temperature. Since the water present contributes its partial pressure to the total pressure of the system, this latter pressure will be increased if the boiling temperature is maintained constant, i.e., the same as employed in the absence of water. Alternatively, if it is desirable to maintain a total system pressure which is the same as in the case where no water is present, the boiling temperature for separating the lower boiling material may be reduced.

The accompanying drawing is a schematic illustration of a preferred embodiment of the invention.

In order to indicate still more fully the nature of the present invention, the following examples of typical procedures are set forth in which parts and percents means parts and percents by weight respectively, unless otherwise indicated, it being understood that these examples are presented as illustrative only and they are not intended to limit the scope of the invention.

Referring to the accompanying drawing, a solution of acetylene in a conventional solvent such as N-methyl-pyrrolidone or butyrolactone, is passed via line 11 into stripper 10 where it is boiled. The solution contains a small portion of water which is not a good solvent for acetylene but is miscible in the solution. A stream of vapor is passed via line 12 from the upper part of the stripper to condenser and separator means 13, and the resulting water layer is separated. Acetylene gas from the condenser separator system is passed via line 19 to a conventional separation and purification system. Solvent is passed via lines 15 and 16 to reboiler 17 and then passed via line 20 back to the stripper. The water layer is passed from separator 13 via line 14 into line 15 whereby there is maintained a supply of water in the reboiled material which is returned to the stripper as well as in the solvent as passed to the absorption system. The solvent bottoms product from the stripper is passed via line 18 back to the absorption system.

EXAMPLE 1

In this operation the stripper is operated at a condenser pressure of 20 p.s.i.a. and a condenser temperature of 300° F. for a feed solution containing 1.6% of acetylene and 1.9% of water. The pressure is maintained at several p.s.i. above atmospheric in order to obviate the use of a compressor for the acetylene removed from the solution, in N-methyl-pyrrolidone.

The reboiler is at 25 p.s.i.a., with no appreciable acetylene present. With water returning to reboiler through line 14, the reboiler temperature is 374° F. About 1.0 lb. of water is returned per 1.6 lbs. of acetylene recovered.

Comparative Example A

A repeat is made of the procedure of Example 1 except that water is not returned to the reboiler through line 14. The reboiler is again at 25 p.s.i.a. but as the solvent is pure, without either acetylene or water, its temperature is 435° F. This high temperature is undesirable, as it requires a higher temperature heating medium and results in accelerated degradation of the solvent.

EXAMPLE 2

The stripper is operated at a condenser pressure of 50 mm. Hg absolute and the condenser temperature is 100° F. for a feed solution of 0.21% of higher boiling acetylenes and 2.1% of water in N-methyl-pyrrolidone.

The pressure in the reboiler is 120 mm. Hg absolute with essentially no higher acetylenes present. With water returning to the reboiler through line 14, the reboiler temperature is 237° F. about 10 lbs. of water is returned per pound of acetylene recovered.

Comparative Example B

A repeat is made of the procedure of Example 2 except that water is not returned to the reboiler through line 14. The reboiler is again at 120 mm. Hg absolute but is without intermediate boiling material and its temperature is 289° F., thus requiring a higher pressure steam heating medium for operation.

The invention is applicable to other systems, and preferably the intermediate boiling material is substantially a non-solvent for the lower boiling material. However, if the lower boiling material is soluble in the intermediate boiling material, a distillation or other separation step is required for separation of the two, after which the intermediate boiling material is recycled in accordance with the invention. The higher boiling acetylenes may be methyl acetylene, vinyl acetylene, and the like. The lower boiling material may be organic or inorganic, and generally the materials employed are chemically inert under the processing conditions. Butyrolactone solvent gives similar results.

In view of the foregoing disclosures, variations and modifications thereof will be apparent to one skilled in the art, and it is intended to include within the invention all such variations and modifications except as do not come within the scope of the appended claims.

What is claimed is:

1. A process for separating a solution into a high boiling point solvent component and a low boiling point solute component in the presence of a component having an intermediate boiling point, said intermediate boiling point component being substantially immiscible with said low boiling point component, wherein the separation is effected in a stripping zone, said low boiling point solute component and said intermediate boiling point component being withdrawn and condensed, and said high boiling solvent component being withdrawn as a bottoms product and wherein said components in said condensed overhead are settled into two phases and separated, the improvement of recycling said intermediate boiling point component directly to the lower portion of said stripping zone.

2. A process for separating a solution into a solvent component and acetylene in the presence of water wherein the separation is effected in a stripping zone, said acetylene and said water being withdrawn as an overhead distillate and condensed, and said solvent component being withdrawn as a bottoms product, and wherein said acetylene and water in said condensed overhead are settled into two phases and separated, the improvement of recycling said water directly to the lower portion of said stripping zone.

3. A process of claim 2 wherein said solvent is N-methylpyrrolidone.

4. A process of claim 2 wherein said solvent is butyrolactone.

References Cited by the Examiner

UNITED STATES PATENTS

| | | | |
|---|---|---|---|
| 2,434,796 | 1/1948 | Hachmuth | 202—70 X |
| 2,476,205 | 7/1949 | McCants | 202—70 |
| 2,568,889 | 9/1951 | Hanson et al. | 202—71 |
| 2,695,322 | 11/1954 | Weedman | 202—42 |
| 2,868,327 | 1/1959 | Rotzler et al. | 55—64 X |
| 3,004,629 | 10/1961 | Cottle | 260—679 |
| 3,017,442 | 1/1962 | Hochgraf | 260—679 |

OTHER REFERENCES

Hasche: Abstract of application Serial Number 633,843, published Feb. 7, 1959, 631 O.G. 283.

NORMAN YUDKOFF, *Primary Examiner.*

GEORGE D. MITCHELL, *Examiner.*